United States Patent [19]

Isono et al.

[11] 4,421,338
[45] Dec. 20, 1983

[54] STRUCTURE OF AN UPPER FORK ASSEMBLY OF A MOTORCYCLE

[75] Inventors: Tokio Isono, Tokyo; Osami Tanaka, Kamifukuoka, both of Japan

[73] Assignee: Honda Giken Kogyo Kabushiki Kaisha, Tokyo, Japan

[21] Appl. No.: 309,017

[22] Filed: Oct. 6, 1981

[30] Foreign Application Priority Data

Oct. 9, 1980 [JP] Japan ................ 55-141802

[51] Int. Cl.³ .................. B62K 19/10; B62K 21/02
[52] U.S. Cl. .................. 280/279; 280/276; 280/280
[58] Field of Search .......... 280/277, 274–287; 180/208; 296/27

[56] References Cited

U.S. PATENT DOCUMENTS 535,145  3/1895  Perkins ........................ 280/280
1,264,643  4/1918  Harley ........................ 280/277
4,212,481  7/1981  Ribi ........................... 280/277 X

FOREIGN PATENT DOCUMENTS

547788  3/1932  Fed. Rep. of Germany ...... 280/277
579278  6/1933  Fed. Rep. of Germany ...... 280/279
302788  12/1928  United Kingdom ............. 280/279
671109  4/1952  United Kingdom ............. 280/276
1494911  12/1977  United Kingdom ............. 280/276

Primary Examiner—Joseph F. Peters, Jr.
Assistant Examiner—Mitchell J. Hill
Attorney, Agent, or Firm—Irving M. Weiner; Pamela S. Burt; John L. Shortley

[57] ABSTRACT

An upper fork for a front fork assembly of a motorcycle comprising a pair of left and right fork member units and a bridge for interconnecting said pair of units. In order to improve the strength and rigidity of the upper fork with reduction of the weight taken into consideration, each fork member unit includes two pipes having upper and lower ends welded to each other, and a cross member welded to mid portions of the two pipes to interconnect them. The bridge is welded to the two pipes and the cross member of each of the pair of fork member units. The cross member and the bridge are formed to be hollow.

4 Claims, 8 Drawing Figures

STRUCTURE OF AN UPPER FORK ASSEMBLY OF A MOTORCYCLE

BACKGROUND OF THE INVENTION

1. Field of the Invention

The present invention relates to an upper fork provided in a front fork assembly constituting an essential part of a suspension system for a front road wheel of a motorcycle, the system including a link motion arrangement therein.

2. Related Art

In a suspension system for a front road wheel of a motorcycle, it is known to employ a telescopic type front fork for suspending the front road wheel including fork pipes and slidable bottom cases which constitute hydraulic shock absorbers. Another type of a suspension system which employs a link motion therein is also known, for example, from U.S. Pat. No. 4,212,481, issued to Valentino Ribi on July 15, 1980.

This particular link motion type suspension system includes an upper fork supported on a body frame, and a swingable lower fork supporting a front road wheel thereon. In such suspension system, damping actions are obtained through a shock absorber having one end joined to either one of the two forks and the other end operatively connected to the other one of the two forks through links.

The upper fork of such a front fork assembly acts as the support for rocking motion of the lower fork, the support for pivotal motion of arms, the support on the motorcycle body, and the support of the shock absorber, and receives reaction forces and shocks through these various parts. Therefore, a sufficient strength and rigidity is required. If the strength and rigidity were to be improved, however, the upper fork would have a harder profile and an increased weight. Moreover, forming of the upper fork by cutting or by casting would make production thereof troublesome and increase production costs and the weight thereof. The present invention is directed toward overcoming such problems.

SUMMARY OF THE INVENTION

The present invention provides an upper fork for a front fork assembly of a motorcycle comprising a pair of fork member units, and a bridge for interconnecting the pair of fork member units. Each of the fork member units including a vertically extending front member formed of a pipe, a rear member extending along said front member and welded at upper and lower ends thereof to upper and lower ends of the front member, and a cross member welded to mid portions of the front member and the rear member to interconnect the front and rear members. The bridge is welded to the front members, the rear members and the cross members of the pair of fork member units.

The present invention also provides an upper fork wherein each of the cross members is formed as a closed hollow body with at least two plates.

The present invention further provides an upper fork wherein the bridge is formed as a closed hollow body.

Accordingly, it is an object of the present invention to provide an upper fork for a front fork assembly of a motorcycle which has a necessary and sufficient strength and rigidity while meeting the requirement for reduction of the weight thereof.

It is another object of the invention to provide an upper fork for a front fork of a motorcycle which can be produced easily and at a reduced cost.

The foregoing and other objects and advantages of the present invention will be made apparent from the following description of a preferred embodiment of the invention made with reference to the accompanying drawings.

DETAILED DESCRIPTION OF THE INVENTION

Figure 1:
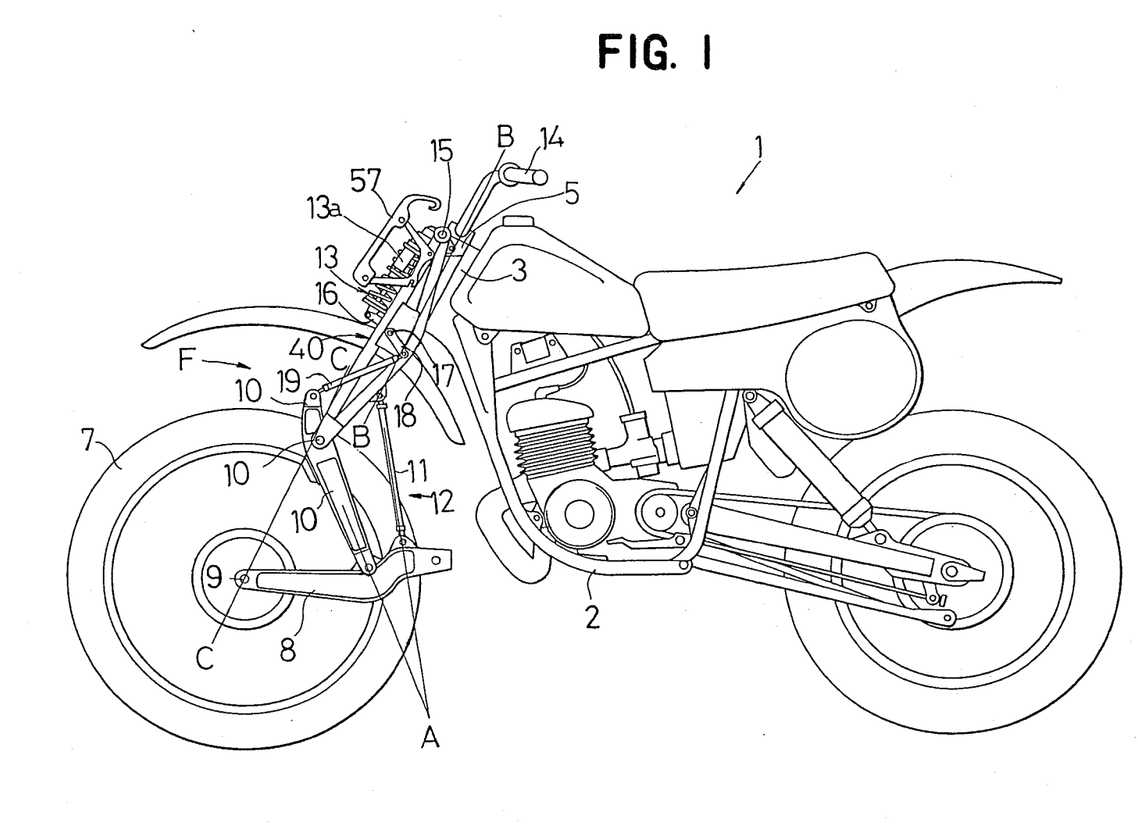
FIG. 1 is a general side elevational view of an exemplary motorcycle including a front fork assembly with which an upper fork embodying the present invention can be employed.
Figure 2:
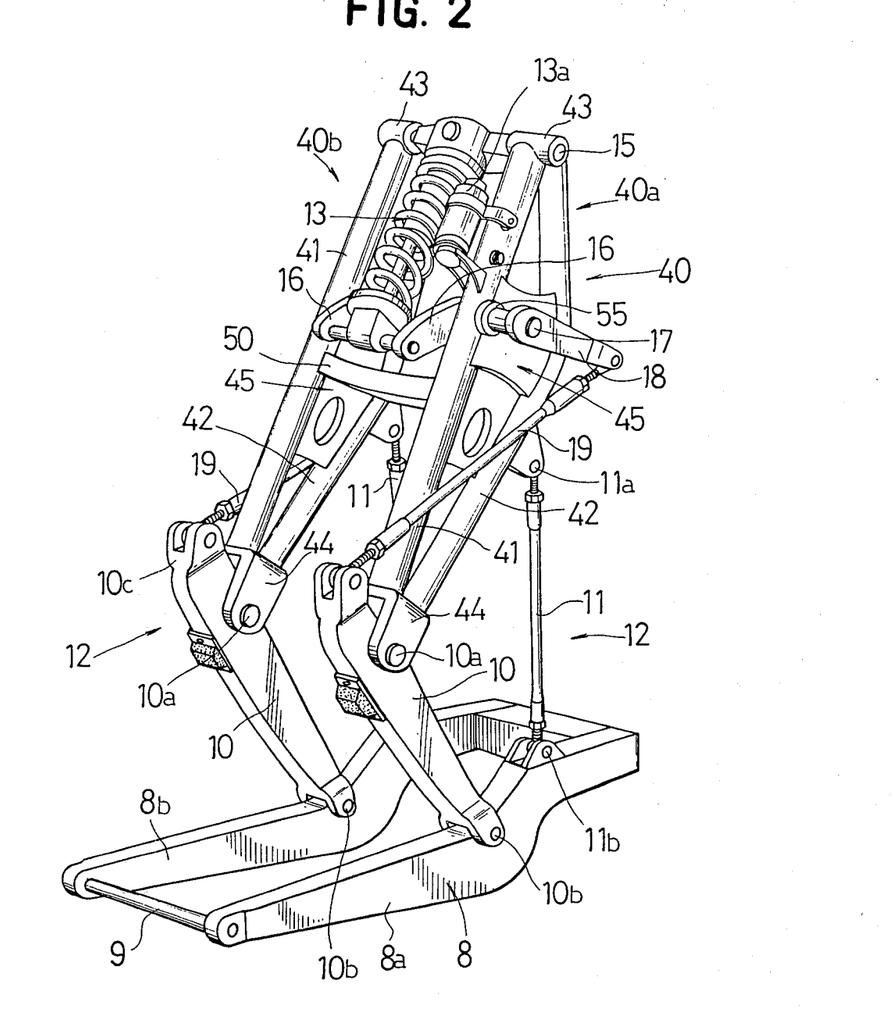
FIG. 2 is a perspective view of a front fork assembly having an upper fork embodying the present invention.
Figure 3:
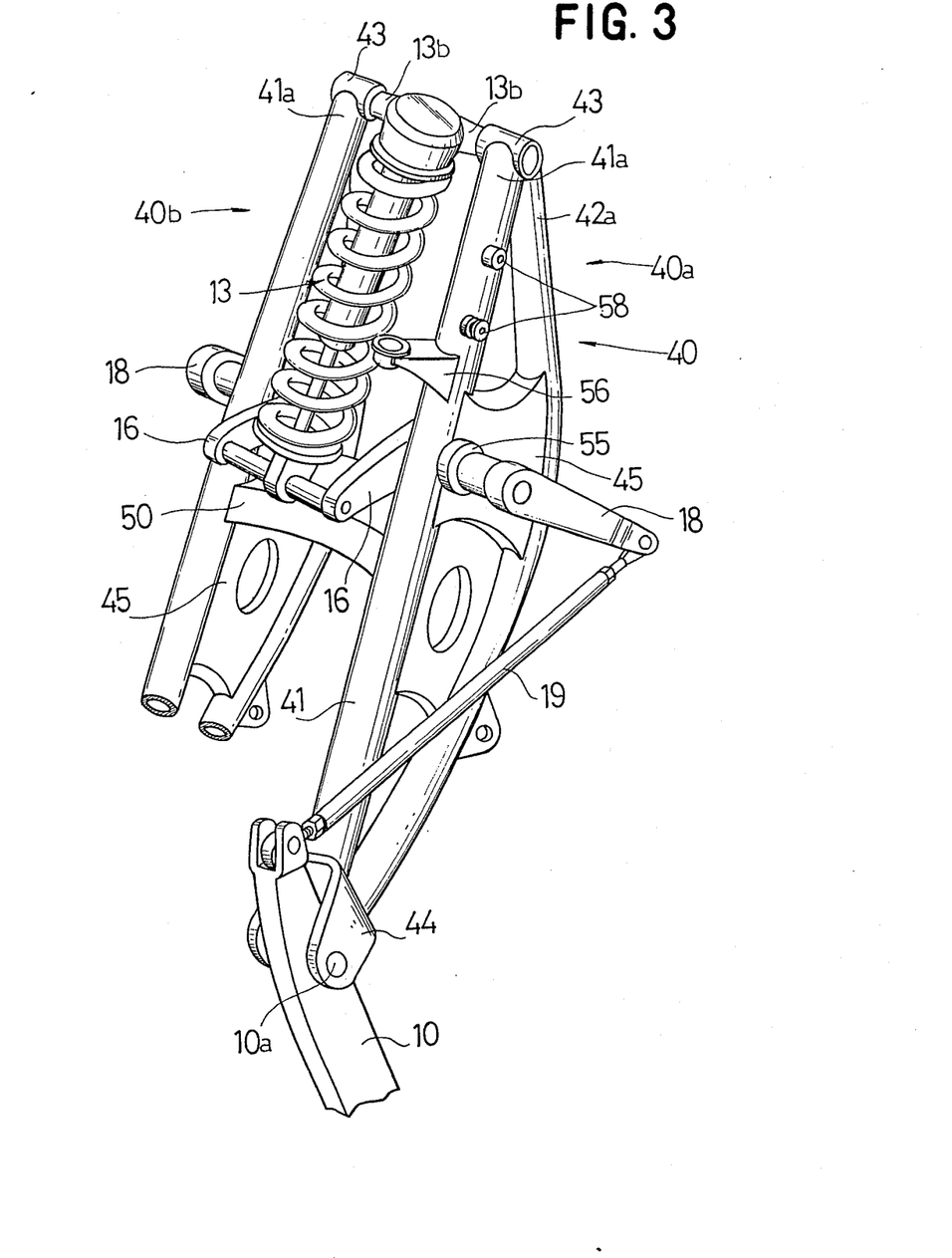
FIG. 3 is an enlarged perspective view of part of the front fork shown in FIG. 2.
Figure 4:
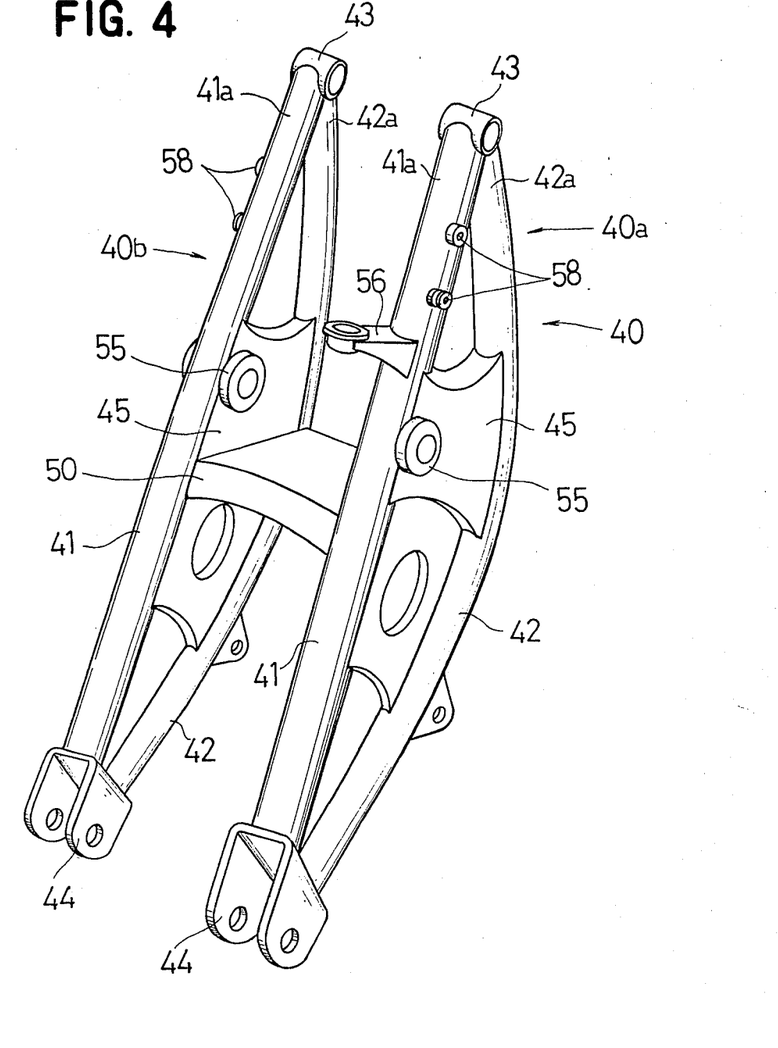
FIG. 4 is a perspective view of an upper fork embodying the present invention.

Referring first to FIG. 1, there is illustrated a motorcycle 1 which includes a front fork assembly generally designated at F. The front fork assembly F includes an upper fork 40 comprising a pair of fork member units 40a and 40b (FIG. 2), and supported for turning motion on a body frame 2 of the motorcycle 1 by means of a top bridge 5 and a bottom bridge 50 thereof which are both pivotally mounted on a head tube 3 disposed at a forward end of the body frame 2. A front road wheel 7 is supported on a lower fork 8 by means of a transverse axle 9 mounted at a forward end of the lower fork 8. The upper fork 40 and the lower fork 8 are interconnected by two front and rear arms 10 and 11 so as to form a quadrilateral link motion assembly 12 which thus includes the upper fork 40 as a stationary link, and the lower fork 8 and the arms 10 and 11 as movable links. As shown in FIG. 2, a set of the arm 10 and the arm 11 are disposed on each of the left and right sides of the wheel 7 so that the motorcycle 1 has two such sets and hence it has a pair of such quadrilateral link motion assemblies 12 disposed on left and right sides of the front road wheel 7, both link motion assemblies 12 having the same configuration and being deformable in a similer manner. A shock absorber 13 for damping upward and downward movements of the front road wheel 7 is disposed on an upper part of the upper fork 40 in front of a handle bar 14. The shock absorber 13 includes a subtank 13a which is mounted on one of the front members 41 by means of a mounting bracket. The shock absorber 13 is mounted at a top end thereof for rotation on and around a pivot 15 which extends transversely between the units 40a and 40b of the upper fork 40. First oscillating arms 16 are connected at free ends thereof to a bottom end of the shock absorber 13. The base ends of the oscillating arms 16 are connected to the base ends of second oscillating arms 18 by way of pivots 17 which extend transversely through the front members 41. Rear ends of the second oscillating arms 18 are connected through pull rods 19 to end portions 10c of the arms 10 which extend upwardly over the fulcra thereof provided by pivots 10a on which the arms 10 are pivotally mounted.

When the front road wheel 7 is moved upwardly due to an uneven road surface, each of the quadrilateral link motion assemblies 12 is deformed such that the lower fork 8 is moved around an instantaneous center which is the point of intersection A (FIG. 1) of extension lines of longitudinal axes of the two arms 10 and 11 which are inclined so as to converge rearwardly and such downwardly and that the axle 9 of the front road wheel 7 is raised along a substantially rectilinear trajectory C—C which is substantially parallel to an axis B—B around which the handle bar 14 is operated to turn. Upon deformation of the link motion assemblies 12, a tensile force is applied to the rod 19 so that both the first and second oscillating arms 16 and 18 are rocked in the clockwise direction as viewed in FIG. 1 and hence the shock absorber 13 is compressed to provide a damping force against the upward movement of the front road wheel 7.

The upper fork 40 of the front fork assembly F as described above is illustrated in detail in FIGS. 3 to 6.

The upper fork 40 includes a pair of fork member units 40a and 40b. These units 40a, 40b have the same structure and each includes a front member 41 made of a vertically elongated pipe, and a rear member 42 formed of a similar pipe and extending along the front member 41 with a mid portion thereof curved rearwardly. The rear member 42 is welded at the top end 42a thereof to the back of the top end 41a of the front member 41. A pair of bearing members 43 formed of short pipes are welded to the top ends of the thus welded two members 41, 42 and extend in parallel with the transverse axle 9. Both bearing members 43 support the aforementioned pivot 15 by which a pair of arms 13b are supported so as to extend from opposite sides of the top of the shock absorber 13.

An inverted U-shaped holding bracket 44 is welded to the lower ends of the front and rear members 41, 42 and is hence integral therewith. Each holding bracket 44 is pivotally mounted on an upper edge portion of one of the arms 10 by means of a pin 10a.

A cross member 45 extends between and is welded to the intermediate portions of the front and rear members 41 and 42. As particularly shown in FIGS. 5 and 6, the cross member 45 includes an inner part comprising separate upper and lower parts 46 and 47. The cross member 45 further includes a vertically elongated intermediate part 48 having a lower half section exposed outside, and a short outer part 49. These parts are formed by stamping a steel plate material. The bottom bridge 50 is disposed between the two cross members 45 of the left and right units 40a, 40b. The bottom bridge 50 includes upper and lower halves 51 and 52.

Figure 5:
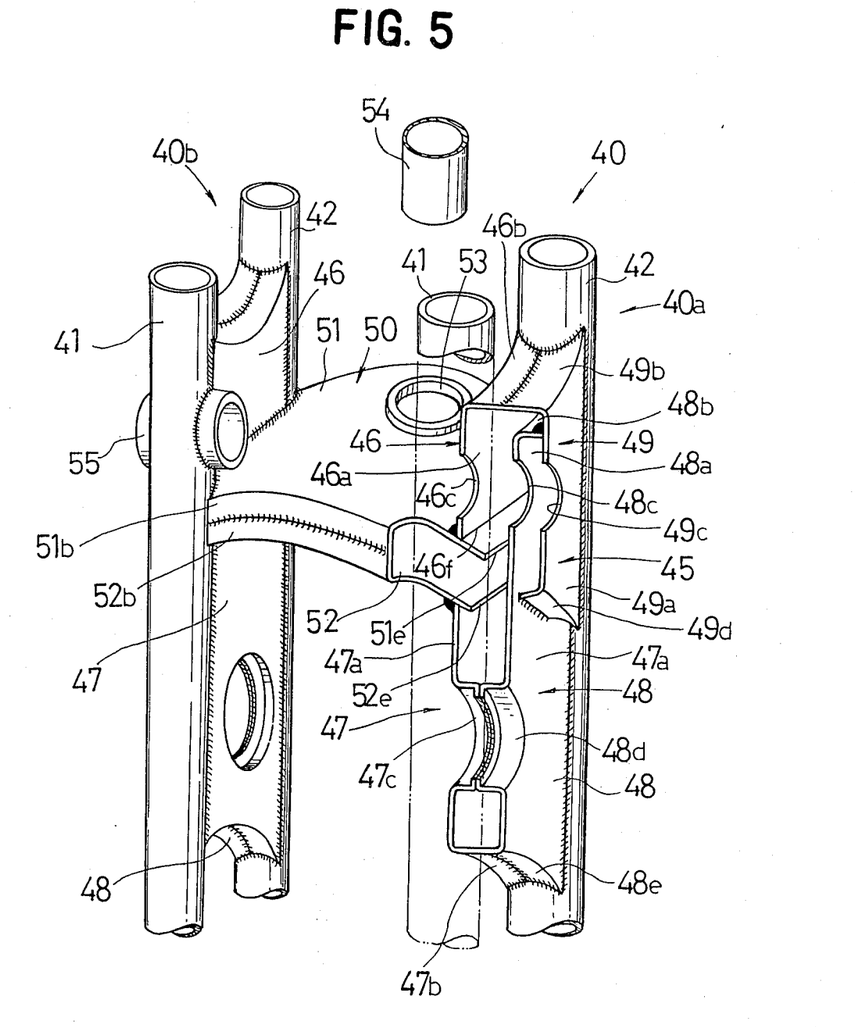
FIG. 5 is a partial fragmentary perspective view of part of the upper fork shown in FIG. 4.
Figure 6:
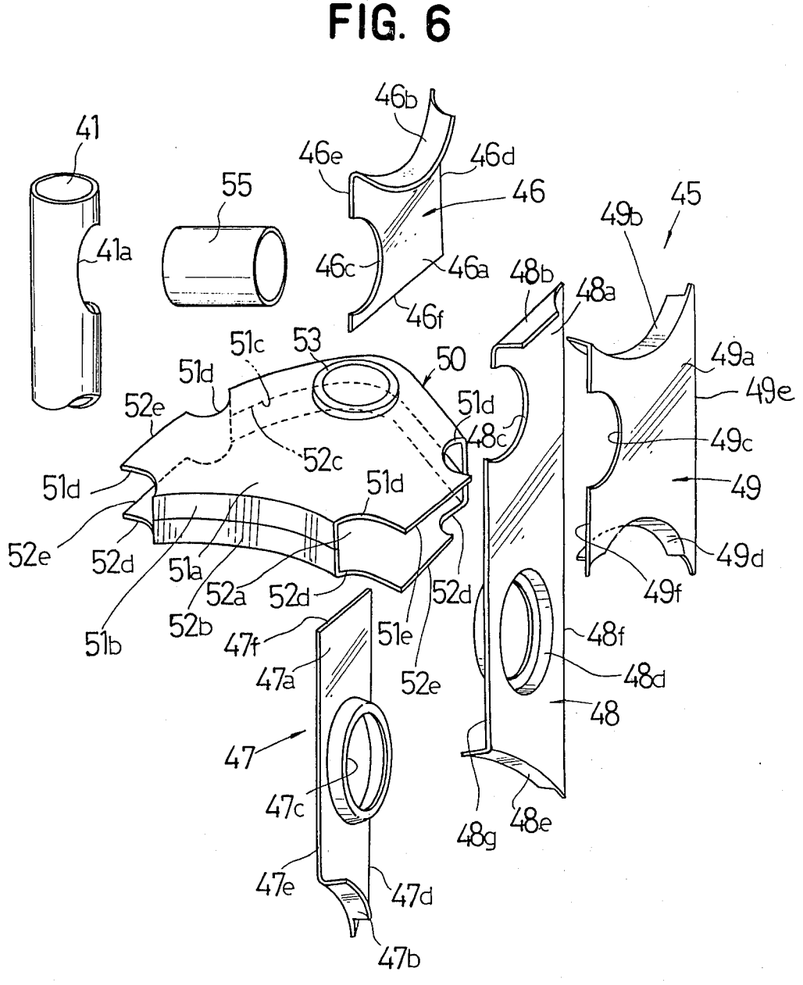
FIG. 6 is a fragmentary perspective view illustrating the relationship of a bridge member relative to a cross member and a front member of a fork member unit.

The upper and lower halves 51, 52 of the bottom bridge 50 are formed by stamping a steel plate material. The upper and lower halves 51, 52 have symmetrical configurations and include flattened web portions 51a, 52a, respectively, which have, at front and rear ends thereof, downwardly and upwardly bent portions 51b, 51c and 52b, 52c, respectively. The web portions 51a, 52a of the upper and lower halves 51, 52 have outwardly opened cutout portions 51d and 52d, respectively, formed at four corner portions thereof. The front bent portions 51b and 52b and the rear bent portions 51c and 52c are welded to each other, respectively, in an edge to edge relationship to integrally fix the upper and lower halves 51, 52. The four members 41 and 42 of both units 40a and 40b are held at intermediate portions thereof by the cutout portions 51d, 52d of the upper and lower halves 51, 52 at the four corner portions thereof and are welded to the halves 51, 52. It is thus clear that the bottom bridge 50 is hollow and is disposed to extend transversely between the left and right units 40a and 40b and inwardly of their component members 41, 42. A collar 53 for receiving a steering column 54 therein is provided to vertically extend through rear mid portions of the web portions 51a, 52a of the upper and lower halves 51, 52 of the bottom bridge 50. Opposite side edges 51e, 52e of the web portions 51a, 52a of the upper and lower halves 51, 52 are formed to be rectilinear in the forward and rearward direction.

The inner upper part 46 of the cross member 45 includes a flattened web portion 46a and a flanged portion 46b which is bent outwardly from the top of the web portion 46a. A semicircular cutout portion 46c is formed intermediately in the front edge of the web portion 46a. Further, each of the members 41 has a rearwardly opened cutout portion 41a formed in a portion thereof above the bottom bridge 50. The cutout portion 46c in the web portion 46a of the inner upper part 46 and the cutout portion 41a in the front member 41 cooperatively define a transversely extending through hole. The upper part 46 has its rear end 46d and its front end 46e welded to the inside outer peripheries of the rear member 42 and the front member 41, respectively, so that it extends between the front and rear members 41, 42. The upper part 46 has its bottom end 46f welded to the upper surface of the web 51a. The inner lower part 47 includes a flattened web portion 47a and a curved flanged portion 47b which is bent outwardly from the bottom end of the web portion 47a. The lower part 47 has a circular flanged hole 47c formed in a mid portion of the web 47a thereof for lighter weight and design purposes. The lower part 47 has its rear end 47d and its front end 47e welded to the inside outer peripheries of the rear member 42 and the front member 41, respectively, so that it extends between the front and rear members 41, 42. The top end 47f of the lower part 47 is welded to the lower surface of the web portion 52a of the bottom bridge 50.

The intermediate part 48 includes a web portion 48a, an upper flanged portion 48b which is bent outwardly from the top of the web portion 48a, and another flanged portion 48e which is bent inwardly from the bottom end thereof. The intermediate part 48 has a cutout portion 48c similar to the cutout portion 46c of the upper part 46 formed in a front portion thereof below the upper flanged portion 48b, and a flanged hole 48d formed at the center of a lower portion thereof in an opposed relationship relative to the circular flanged hole 47c of the inner lower part 47. The intermediate part 48 further has the front and rear edges 48g, 48f thereof welded to the outside outer peripheries of the front and rear members 41, 42, respectively, so that it extends between the front and rear members 41, 42. The intermediate part 48 and the inner lower part 47 are welded to each other at the flanges of their respective circular flanged holes 48d and 47c and at their lower flanged portions 48e, 47b. The web portion 48a of the intermediate member 48 is welded at the edge of the cutout portion 48c thereof to side edges 51e, 52e of the web portions 51a, 52a of the bottom bridge 50. Thus, the bottom bridge 50 is formed as a closed hollow body which is defined at the front and rear sides thereof by the flanged portions 51b, 52b and 51c, 52c, respectively, at the four corner portions thereof by the front and rear members 41, 42, and at the opposite sides thereof by the intermediate parts 48.

The outer part 49 is disposed along and outside of an upper portion of the intermediate part 48 and includes a web portion 49a, an upper flanged portion 49b which is bent inwardly from the top of the web portion 49a and a shorter lower flanged portion 49d which is bent inwardly from the bottom end of the web portion 49a. The outer part 49 has its front and rear edges 49f, 49e welded to the front and rear members 41, 42, respectively, so that it extends between these members 41, 42. The outer part 49 further has its upper flanged portion 49b welded to the flanged portion 46b of the inside upper part 46, and has its lower flanged portion 49d welded to the outer side surface of the web portion 48a of the intermediate part 48. In addition, the intermediate part 48 has the outwardly bent upper flanged portion 48b at the top thereof welded to the inner surface of the web or body portion 49a of the outer part 49.

The above described parts 46, 48, 49 have their cutout portions 46c, 48c, 49c disposed in an aligned concentrical relationship to define, in cooperation with the cutout portion 41a of the front member 41, a through hole which extends in a widthwise direction. A bearing collar 55 is inserted into the thus defined through hole and is welded to the thus formed cross member 45 and the front member 41. Each pivot shaft 17 is extended through and supported by the bearing collar 55 disposed on each of the left and right units 40a, 40b. Again, the bottom bridge 50 is disposed to extend between the front and rear members 41, 42 and between the left and right units 40a, 40b and is integrally welded to all of these members 41, 42 and units 40a, 40b. And, the cross members 45 are each formed as a closed hollow body.

The upper fork 40 can thus be obtained with an arrangement if pipes and steel plate stampings.

Figure 7:
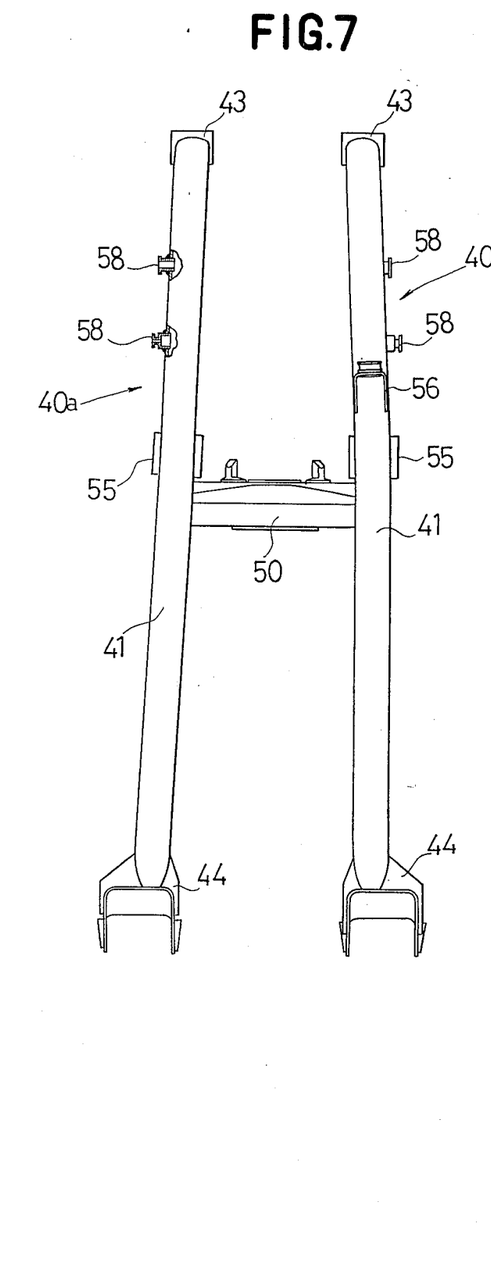
FIG. 7 is a partially broken front elevational view of the upper fork shown in FIG. 4.
Figure 8:
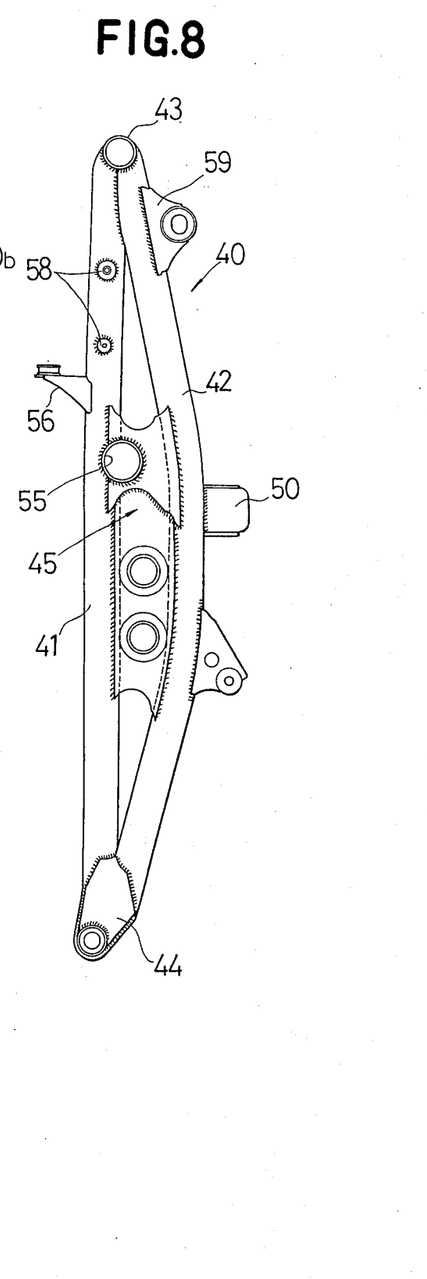
FIG. 8 is a side elevational view of the upper fork shown in FIG. 4.

FIGS. 7 and 8 respectively show a front elevational view and a side elevational view of an embodiment of the present invention. As also apparent from FIGS. 3 and 4, a stay 56 for supporting the aforementioned sub-tank 13a thereon is welded to a front side portion of the front member 41 of one unit 40a above the bottom bridge 50. Metal fixtures 58 are provided on the outside of an upper portion of each of the front members 41 of the left and right units 40a, 40b. A number plate 57 (FIG. 1) is attached to the front of the upper fork 40 by the metal fixtures 58. A bracket 59 for attaching the top bridge to the front fork is welded to an upper rear portion of each of the rear members 42 of the left and right units 40a, 40b.

It is to be noted that, although the embodiment illustrated in the drawings is designed such that the bottom bridge includes two welded steel plates and the cross member includes four parts, the actual structure may be selectively designed to have other suitable arrangements.

As is apparent from the foregoing description, because the upper fork according to the present invention has a structure of pipes and steel plate stampings welded to one another with its cross members and bottom bridge each being formed as a closed hollow body, it can be provided with sufficient strength and rigidity especially due to the employment of the pipes. Particularly because a closed hollow structure is employed for the bottom bridge and the cross member, the stress acting on the bottom bridge can be dispersed to its component parts so that it can sufficiently support the shock, reaction, and so on, acting thereon. Thus, the present invention is advantageous in that the front fork can be provided with a high rigidity and a reduced weight, and can be produced easily and at a reduced cost.

We claim:

1. An upper fork for a front fork assembly of a motorcycle, comprising:
   a pair of fork member units, and a bridge for interconnecting said pair of fork member units;
   each of said fork member units including a substantially vertically extending front member formed of a pipe, a rear member extending along said front member and welded at upper and lower ends thereof to upper and lower ends of said front member, and a cross member welded to mid portions of said front member and said rear member to interconnect said front and rear members;
   said bridge being welded to said front members, said rear members and said cross members of said pair of fork member units;
   each of said cross members being formed as a closed hollow body with at least two plates; and
   said bridge being formed to have a closed hollow body.

2. An upper fork according to claim 1, wherein:
   said bridge comprises upper and lower halves having substantially symmetrical configurations, each of said halves being formed of a steel plate material; and
   each of said halves of said bridge include a web portion and flanged portions, said flanged portions of said respective halves being joined together to integrally attach said upper half to said lower half such that said web portions are arranged in spaced-apart relation.

3. An upper fork according to claim 2, wherein:
   each of said cross members comprises an inner part, a vertically elongated intermediate part and a relatively short outer part, each of said inner, intermediate and outer parts of said cross members being formed of a steel plate material;
   said inner part being joined to said outer part at respective upper flanged portions thereof;
   said inner part being joined to said intermediate part at respective lower flanged portions thereof; and
   said outer part being joined to said intermediate part at a flanged portion of said outer part.

4. An upper fork according to claim 3, wherein:
   said flanged portions of said bridge halves comprise front and rear end flanged portions;
   said web portions of said bridge halves are provided with cut-out portions at each of the corners thereof;
   said front members and said rear members of said fork members units are welded to said bridge at said cut-out corner portions thereof;
   said bridge is welded at opposite sides thereof to said intermediate parts of said cross members; and
   whereby said closed hollow body of said bridge is defined at the top and bottom thereof by said webs of said bridge, at the front and rear sides thereof by said front and rear flanged portions of said bridge member, at the corner portions thereof by said front and rear members of said fork units, and at the opposite sides thereof by said intermediate parts of said cross members.

* * * * *